US010468065B2

(12) United States Patent
Ramey et al.

(10) Patent No.: US 10,468,065 B2
(45) Date of Patent: Nov. 5, 2019

(54) VIDEO FRAME DIFFERENCE ENGINE

(71) Applicant: USTUDIO, INC., Austin, TX (US)

(72) Inventors: John Ramey, Austin, TX (US); Josh Marshall, Austin, TX (US)

(73) Assignee: uStudio, Inc., Austin, TX (US)

( * ) Notice: Subject to any disclaimer, the term of this patent is extended or adjusted under 35 U.S.C. 154(b) by 8 days.

(21) Appl. No.: 15/771,158

(22) PCT Filed: Oct. 28, 2016

(86) PCT No.: PCT/US2016/059526
§ 371 (c)(1),
(2) Date: Apr. 27, 2018

(87) PCT Pub. No.: WO2017/075493
PCT Pub. Date: May 4, 2017

(65) Prior Publication Data

US 2018/0308522 A1 Oct. 25, 2018

Related U.S. Application Data

(60) Provisional application No. 62/247,219, filed on Oct. 28, 2015.

(51) Int. Cl.

| | |
|---|---|
| ***H04N 19/12*** | (2014.01) |
| ***G11B 27/28*** | (2006.01) |
| ***H04N 21/2343*** | (2011.01) |
| ***H04N 21/234*** | (2011.01) |
| ***H04N 21/44*** | (2011.01) |

(Continued)

(52) U.S. Cl.
CPC ............ *G11B 27/28* (2013.01); *G11B 27/031* (2013.01); *G11B 27/102* (2013.01); *H04N 19/12* (2014.11);

(Continued)

(58) Field of Classification Search
CPC ................................ G11B 27/28; H04N 19/12
See application file for complete search history.

(56) References Cited

U.S. PATENT DOCUMENTS 5,978,791 A 11/1999 Farber et al.
6,961,463 B1 11/2005 Loui et al.
(Continued)

FOREIGN PATENT DOCUMENTS

WO 2010021966 A1 2/2010

OTHER PUBLICATIONS

The International Searching Authority, Written Opinion of the International Search Authority and the International Search Report dated Feb. 9, 2017 in International application No. PCT/US2016/059526, eight pages.

*Primary Examiner* — Girumsew Wendmagegn
(74) *Attorney, Agent, or Firm* — Trop, Pruner & Hu, P.C.

(57) ABSTRACT

An embodiment detects where frames within a video have been added, deleted, or changed. The embodiment tracks the modifications through subsequent versions of the source video, and retains various metadata (corresponding to the individual edits) that describes the context and specifics of the edits. In an embodiment only changes to the original video need be tracked by preserving only those clips that have been added, removed, or changed. This ability enables a video editor to maintain the various changes made to a video and see the history of changes while alleviating much of the file storage associated with large, high-quality videos. Other embodiments are described herein.

19 Claims, 10 Drawing Sheets

(51) Int. Cl.

| | |
|---|---|
| ***H04N 21/488*** | (2011.01) |
| ***H04N 21/8547*** | (2011.01) |
| ***G11B 27/031*** | (2006.01) |
| ***G11B 27/10*** | (2006.01) |
| *H04N 21/231* | (2011.01) |
| *H04N 21/232* | (2011.01) |

(52) U.S. Cl.

CPC ... *H04N 21/2343* (2013.01); *H04N 21/23418* (2013.01); *H04N 21/44008* (2013.01); *H04N 21/4882* (2013.01); *H04N 21/8547* (2013.01); *H04N 21/231* (2013.01); *H04N 21/232* (2013.01)

(56) References Cited

U.S. PATENT DOCUMENTS 6,999,600 B2 2/2006 Venetianer et al.
7,003,153 B1 2/2006 Kerofsky
8,238,669 B2 8/2012 Covell et al.
8,259,177 B2 9/2012 Gits et al.
8,406,456 B2 3/2013 More
8,559,516 B2 10/2013 Hardacker et al.
8,942,487 B1 1/2015 Baluja et al.
2004/0001142 A1 1/2004 Kumhyr
2004/0223629 A1 11/2004 Chang
2005/0172312 A1 8/2005 Lienhart et al.
2006/0020830 A1 1/2006 Roberts
2006/0271947 A1 11/2006 Lienhart et al.
2008/0089554 A1 4/2008 Tabankin et al.
2008/0239159 A1 10/2008 Read et al.
2009/0154806 A1 6/2009 Chang et al.
2010/0085481 A1* 4/2010 Winter ............... G06K 9/00711 348/513
2011/0032984 A1 2/2011 Dorman et al.
2011/0285904 A1* 11/2011 Oami ................ G06F 17/30781 348/461
2012/0087583 A1 4/2012 Yang et al.

* cited by examiner

```
Pseudocode
def frame_signatures(video_file, signature_encoding_file):
   video_frames = extract_frames(video_file)
   for frame in video_frames:
      image_lowres = resize_image(frame, width=IMG_WIDTH,
height=IMG_HEIGHT)
      dct_coeffs = dct_2d(image_low_res)
      dct_upperquadrant = dct_coeffs[:SIZE_QUADRANT, :SIZE_QUADRANT]
      frame_signature = image_hash(dct_upperquadrant)
      write_to_file(frame_signature, file=signature_encoding_file)

def frame_lcs(source_encoding, updated_encoding):
   m, n = source_encoding.length, updated_encoding.length
   C = zeros_matrix(num_rows=m, num_columns=n)
   for i in range(m):
      for j in range(n):
         frame_similarity = hamming_distance(source_encoding[i],
updated_encoding[j])
         if frame_similarity < SIMILARITY_THRESHOLD:
            C[i, j] = C[i - 1, j - 1] + 1
         else:
            C[i, j] = max(C[i, j - 1], C[i - 1, j])
   return C
def frame_diff(i, j):
   frame_similarity = hamming_distance(source_encoding[i],
updated_encoding[j])
   if i > 0 and j > 0 and frame_similarity < SIMILARITY_THRESHOLD:
      frame_diff(i - 1, j - 1)
      yield "Frame %s updated" % str(i)
   else if j > 0 and (i == 0 or C[i, j - 1] >= C[i - 1, j]):
      frame_diff(i, j - 1)
      yield "Frame %s added" % str(j)
   else if i > 0 and (j == 0 or C[i, j - 1] < C[i - 1, j]):
      frame_diff(i - 1, j)
      yield "Frame %s removed" % str(i)
```

FIGURE 3A

```
# Constants
IMG_WIDTH = 32 # Equivalent to p
IMG_HEIGHT = 32 # Equivalent to p
SIZE_QUADRANT = 8 # Equivalent to k
SIMILARITY_THRESHOLD = 5

# Filenames of source and updated videos and their signature encodings
source_video = 'source-video.mp4'
source_encoding_file = 'source-video.sef
updated_video = 'updated-video.mp4'
updated_encoding_file = 'updated-video.sef

# Construct frame signatures for the source and updated videos
frame_signatures(source_video, source_encoding_file)
frame_signatures(updated_video, updated_encoding_file)

# C[i, j] is the length of the LCS between source_encoding[i] and
# updated_encoding[j]
C = frame_lcs(source_encoding_file, updated_encoding_file)
# Determine which frames are added, removed, or updated
m, n = source_encoding.length, updated_encoding.length
frame_differences = list(frame_diff(m, n))
```

FIGURE 3B

VIDEO FRAME DIFFERENCE ENGINE

PRIORITY CLAIM

This application claims priority to U.S. Provisional Patent Application No. 62/247,219 filed on Oct. 28, 2015 and entitled "Video Frame Difference Engine", the content of which is hereby incorporated by reference.

TECHNICAL FIELD

Embodiments of the invention are in the field of video and, in particular, video editing and post production.

BACKGROUND

In a standard video post-production workflow, a sequence of edits is applied to a source video by adding, deleting, and updating its frames to generate a final video. Intermediate edits are rarely saved because the user would have to preserve the individual video files video files, which are typically quite large in terms of file size. However, preserving these intermediate changes would preserve editing history.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIGS. 3A and 3B include pseudocode for embodiments of the invention.

DETAILED DESCRIPTION

Figure 1:
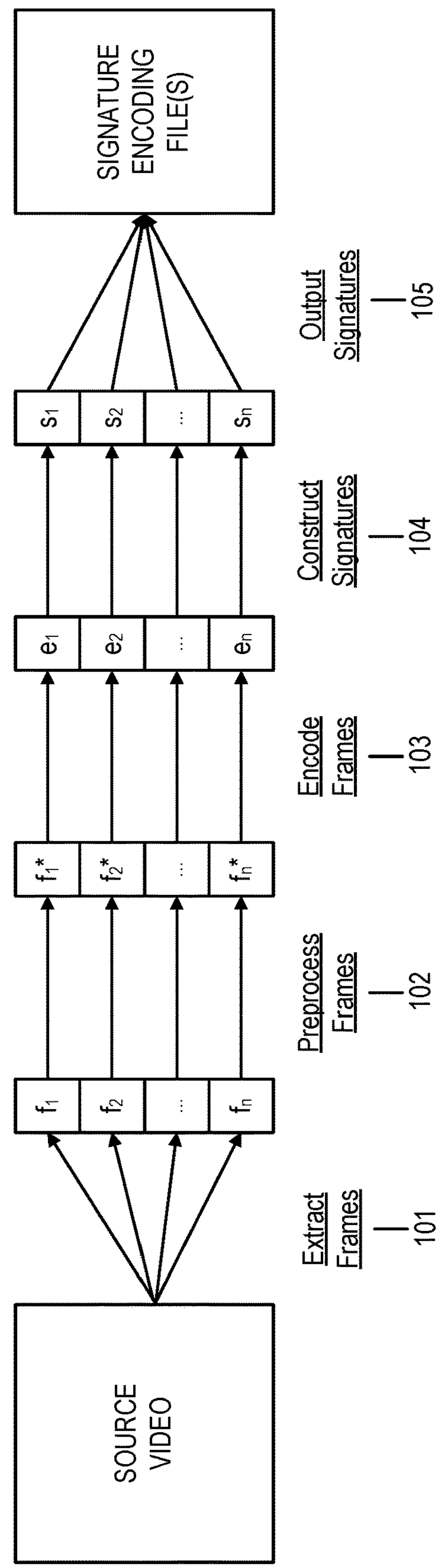
FIG. 1 includes a diagram for constructing a signature encoding file from a video or video clip in an embodiment of the invention.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment. At times herein descriptions cover several different figures at once. For clarity, figures include components where the most significant value denotes the figure that includes the component (e.g., element 3XX would be found in FIG. 3 and element 4XX would be found in FIG. 4).

Applicant determined a solution to address the use case described above in the "Background" would function by detecting where frames within a video have been added, deleted, or changed, tracking the modifications through subsequent versions of the source video, and retaining various metadata corresponding to the individual edits that describes the context and specifics of the edits. Only changes to the original video need be tracked by preserving only those clips that have been added, removed, or changed. This ability enables a video editor to maintain the various changes made to a video, see the history while alleviating much of the file storage associated with large, high-quality videos.

An embodiment of the invention employs techniques of "image similarity" to compare two video frames and determine whether the video frames are approximately equal. Several "image similarity" approaches are available. For instance, two images can be considered "similar" if their raw pixel values are approximately equal. However, Applicant determined this approach is sensitive to image quality and lacks robustness to slight image transformations (e.g., rotations, translations, artifacts from encoding a video in a different resolution). Instead, an embodiment first considers a video source as a stream of visual information from which a sequence of frames is extracted in various approaches, including the original progressive source frames, merging interlaced fields into single frames, sampling across multiple frames into a smaller frame rate, etc. These frame transformations may occur on a sequence from any type of video source, such as finished assets in container formats (e.g., Quicktime MOV, MPEG 4 containers, MPEG 2 transport streams, AVI, MKV), continuous network streams (e.g., RTMP, RTP, HLS, DASH), and other methods of sharing video sources. The transformations are sourced from video codecs ranging from uncompressed data to H.264, Windows Media Video, MPEG 2, and many others. The visual data from each resulting frame transformation can be referenced as a standard image in a variety of file formats, such as PNG, JPEG, GIF, BMP, or even raw formats like PNM (e.g., PPM, PGM, etc). The pixels within a frame can be encoded using a variety of mathematical representations, including the discrete cosine transform (DCT) and the fast Fourier transform (FFT). For instance, the DCT encodes a frame as a sum of sinusoids with different amplitude and frequency coefficients. The DCT coefficients uniquely identify a frame such that the frame can be recovered from the DCT coefficients without loss of information. Moreover, two frames that have the same DCT coefficients must be equal.

"Image similarity" can then be computed by comparing the encodings, their coefficients, or a mathematical formula applied to the encodings or their coefficients. For instance, two video frames can be defined as similar if their DCT coefficients or their sum are approximately equal. This relates to image compression, which is achieved by discarding small high-frequency DCT sinusoids because the sum of DCT components is approximately equal to the original image.

Alternatively, image similarity may be computed via "image hashing." By applying a mathematical function to the DCT coefficients, an image is hashed (encoded) as a string of binary digits (bits). Rather than comparing DCT coefficients of two images, a similarity metric (e.g., Manhattan distance, Euclidean distance, Hamming distance) computes the distance between the image hashes of two images to determine their similarity. In particular, if the bit strings of both images are the same, the images are considered the same.

Identifying Video Differences

An embodiment identifies the frames added, deleted, or updated from a source video by comparing its frames and the frames of a second video using image similarity. For example, if video A is prepended with 120 frames (5-second clip at 24 frames per second) resulting in video B, an embodiment detects the frames added. To identify changes to a source video, each of its frames are encoded as a "frame signature" using a standard image encoding (e.g., DCT, FFT), an "image hash" (e.g., perceptual hash, average hash, difference hash), or other mathematical encoding (e.g., wavelets, latent variable models, neural networks).

In FIG. 1, blocks 101-105 illustrate the construction of a signature encoding file containing the frame signatures of video frames extracted from a video file having a standard video format (e.g., AVI, Windows Media Video, QuickTime File Format, Flash Video). In block 101, a sequence of frames from a video or a video clip is extracted as a sequence of images in a standard image file format (e.g., PNG, JPEG, GIF, BMP) resulting in a sequence of n frames. In block 102, each of the n frames undergoes preprocessing steps, including resizing, rotations, image sharpening, image smoothing, colorization, etc. In block 103, the preprocessed frames are mathematically encoded via a specified encoding (e.g., DCT, FFT). In block 104, each of the encoded video frames is further encoded as a frame signature. This second encoding can be the identity function or a function of the first encoding or its coefficients. For instance, an image hash computed from the DCT coefficients of a large video frame could yield a compressed bit sequence. In block 105, the frame signatures are written to one or more signature encoding files.

Figure 2:
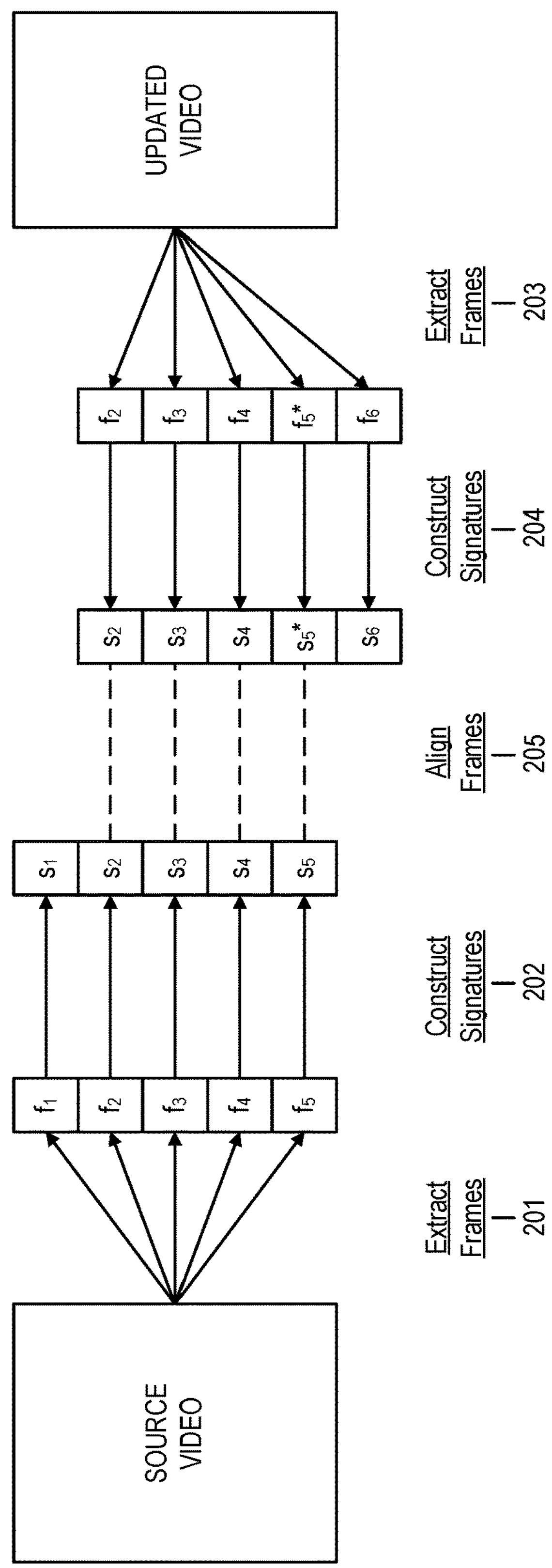
FIG. 2 includes a diagram for aligning frame signatures of a source video and an updated video in an embodiment of the invention.

After a source video's frames have been extracted and transformed into frame signatures, changes to the video can be identified after the video is edited and a new video file is created. In FIG. 2, blocks 201-205 illustrate that a source video is edited in post-production, resulting in an updated video. The frames added, deleted, and removed are identified by "aligning" the frame signatures of the source video and the updated video. For brevity, the preprocessing and encoding steps of blocks 102 and block 103 are omitted from FIG. 2. In block 201, five frames, f_1-*f*_5, are extracted from the source video. In block 202, frame signatures, s_1-*s*_5, from the five frames are constructed. In block 203, the frames of the updated video are extracted. For illustration purposes, frame f_1 is deleted, frame f_5 is updated to a new frame ⟦ f_5⟧ ^*, and a new frame f_6 is appended. Frames f_2-*f*_4 remain unchanged. In block 204, the frames extracted from the updated video are processed to produce frame signatures. In block 205, the pair of frame-signature sequences of the source and updated videos is "aligned." By "aligning" the pair of signature sequences, an embodiment identifies that the signatures, s_2-*s*_4 are shared preserving their order, whereas s_1 has no corresponding signature in the updated video. Hence, frame f_1 has been deleted. Similarly, the signature alignment yields the conclusion that frame f_5 has been updated as ⟦ f_5⟧ ^* and that frame f_6 has been appended to the updated video.

An embodiment determines which frames have been changed or deleted as well as identifying any new frames added by aligning the sequence of the source video's frame signatures with the sequence of the updated video's frame signatures while preserving the order of the frames. The alignment of frames from a source video and an updated video is equivalent to solving the longest common subsequence (LCS) problem. The LCS problem has a variety of solutions, including the Hunt-McIlroy algorithm, and has several open-source software implementations, including the popular diff utility.

An embodiment "aligns" the pair of frame signature sequences by identifying the longest sequence of frame signatures present in both videos. A frame signature is considered present in a source and updated video if the image similarity of the corresponding pair of frames exceeds a specified threshold using a specified similarity function (e.g., Rand index, Jaccard similarity), or equivalently if a specified distance function (e.g., Euclidean, Hamming, Manhattan) is smaller than a specified threshold. Hence, to align the signature frames from two videos, a solution to the LCS problem (e.g., Hunt-McIlroy algorithm) need only incorporate a threshold to determine whether two frames are sufficiently similar.

FIGS. 3A and 3B illustrate pseudocode resembling Python for an example solution to the LCS problem where two frames are deemed similar if their image similarity exceeds a given threshold. The example solution produces frame signatures using an image hash, compares image hashes using the Hamming distance, and employs a modified Hunt-McIlroy algorithm. This example, however, could readily utilize a number of other frame signature encodings, similarity functions, and solutions to the LCS problem.

Continuing with the example in FIGS. 3A and 3B, a source video with filename source-video.mp4 is edited by a user to produce an updated video file named updated-video.sef. The source and updated videos are encoded as frame signature encoding files named source-video.sef and updated-video.sef, respectively. The frame signature files are constructed by first extracting the individual frames from each file and resizing them as low-resolution p×p images. Next, a 2-dimensional DCT is applied to each of the individual low-resolution p×p images to produce a p×p matrix of DCT coefficients corresponding to each frame extracted. From each matrix of DCT coefficients, the upper left quadrant of size k×k is preserved, 1≤k≤p, resulting in a k×k matrix. Persons skilled in the art will recognize that the previous step employs image compression comparable to the technique used in the JPEG image standard. An image hashing process is then applied to the k×k matrix of DCT coefficients to produce k^2 binary digits (bits) for each video frame extracted by setting the bit to 1 if the DCT coefficient is above a specified threshold or a threshold based on the DCT coefficients (e.g., mean, median) and 0 otherwise.

Continuing with the example in FIGS. 3A and 3B, the similarity of two frames is computed by calculating the Hamming distance between the two image hashes to calculate the number of bits at which the hashes differ. An m×n matrix C is constructed where the element c_ij is the length of the LCS between the ith signature frame of the source video and the jth signature frame of the updated video, where m and n are the number of frames extracted from the source and updated videos, respectively. From the matrix C, the frames added, removed, and updated are identified in a recursive manner.

Continuing with the example in FIGS. 3A and 3B, the values of the similarity threshold, p, and k are set by the user to increase sensitivity of the frame similarity or to reduce the probability that the image hash of two unequal frames collides. The values can also be set by an automatic model selection procedure (e.g., cross-validation, jackknifing, bootstrapping).

Tracking Video Changes

An embodiment stores the original video, including its frames, the audio tracks corresponding to the source frames, and various metadata describing the video (e.g., video codec type, average frame rate, height, width, display aspect ratio, bit rate, audio codec type, audio bit rate, number of audio channels) within a "stage." The stage stores the frames from the source video, the timestamp of each frame, and the sequence order of each frame. The stage also stores the audio track corresponding to each frame in the source video.

Within the stage, an embodiment tracks changes made to the source video when constructing an updated video (i.e., adding, removing, or updating frames within the source video). The stage stores each frame added, its corresponding audio track, the timestamp of the frame added, and the sequence order of the frame added. The timestamps and sequence order of the frames from the source video occurring after the added frames are updated within the stage. For instance, if a single frame is added between frames 9 and 10 in a 1-second video recorded at 24 frames per second, an updated video with 25 frames is produced. The 10th frame from the source video occurring 10/24 seconds into the video becomes the 11th frame in the updated video occurring 11/24 seconds into the video.

A frame that is deleted from the source video when constructing the updated video is preserved within the stage. The deleted frame, however, is not available within the updated video for playback. The timestamps and sequence order of the frames from the source video occurring after the frames removed are updated within the stage. For instance, if the first frame is removed from a 1-second video recorded at 24 frames per second, an updated video with 23 frames is produced. The 2nd frame from the source video occurring 2/24 seconds into the video becomes the 1st frame in the updated video occurring 1/24 seconds into the video.

A frame that is updated from the source video when constructing the updated video is preserved within the stage. The updated frame is also stored within the stage along with its audio track, the timestamp of the frame, and the sequence order of the frame. Timestamps and sequence order for frames occurring before and after the updated frame need not be updated.

An embodiment tracks stage metadata describing the context and changes made to the source video within the stage, including a stage unique identifier and a timestamp when the changes occurred. A user can provide additional stage metadata, such as user information (e.g., user unique identifier, user's name) and a description of the changes made.

An embodiment tracks frame-based temporal (FBT) metadata within the stage describing a sequence of frames in the source or updated video. The FBT metadata may include a unique identifier, an array indexing the sequence order of the frames changed, a timestamp when the frame changes were made, and a title and description of the changes made. A user may provide additional custom FBT metadata describing a range of frames within a stage. For instance, custom metadata describing an annotation to be displayed by a video player during video playback can be provided along with the annotation text to display, the text's font and font size, and x-y coordinates of where the annotation is to be displayed.

Figure 4:
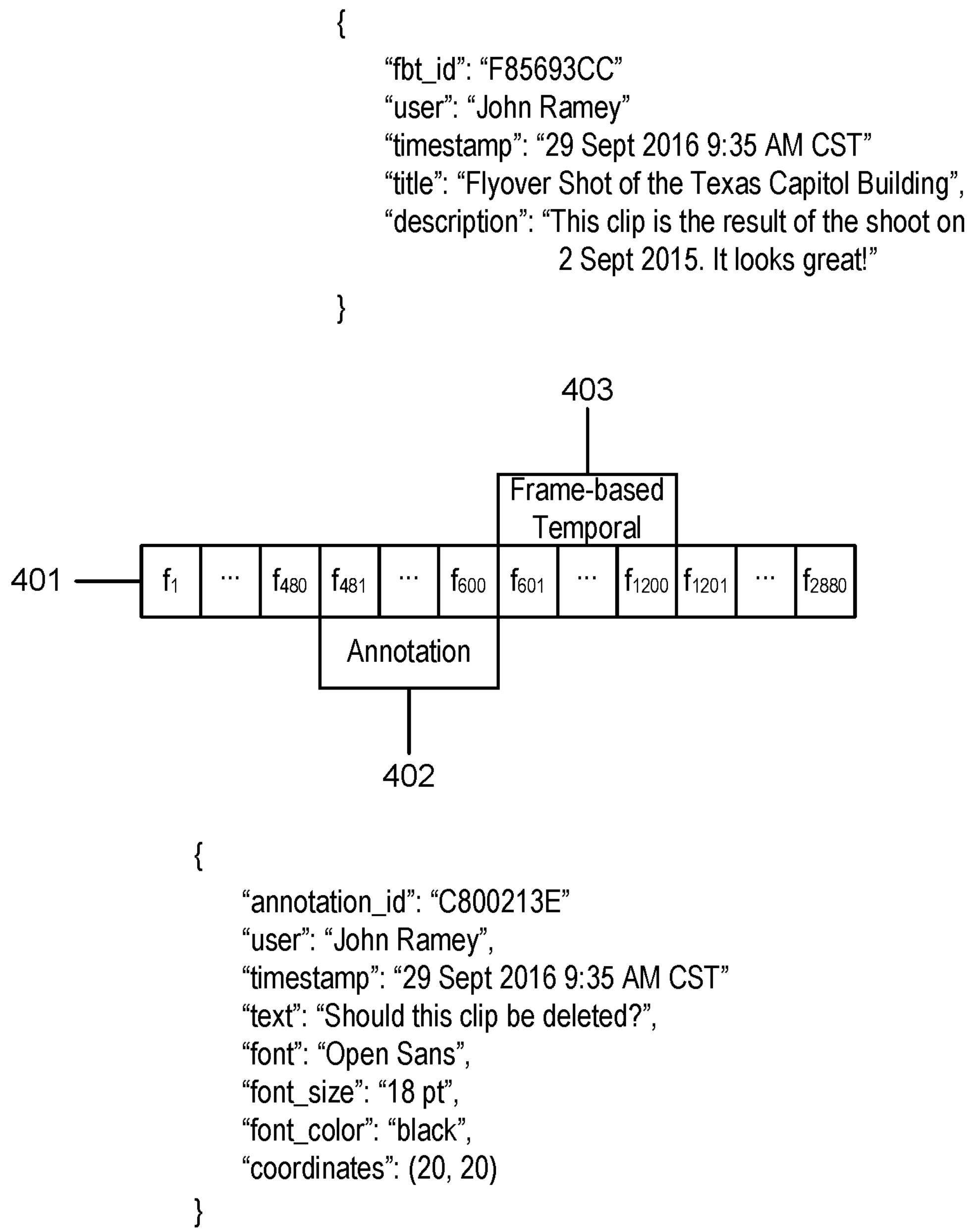
FIG. 4 includes a diagram for attaching frame-based temporal and custom metadata in an embodiment of the invention.

In FIG. 4, blocks 401-403 illustrate an example where custom metadata and frame-based temporal metadata are attached to frames within a video. In block 401, the frames for a two-minute video with a frame rate of 24 frames per second are given. In block 402, custom metadata is provided by the user in the JSON format for the 120 frames (i.e., 5 seconds of video) f_4814_600 to display the annotation "Should this clip be deleted?" in the upper-left corner of during video playback. The custom annotation metadata is used as a means of communication to other viewers during video playback and is made available to a video player (e.g., YouTube® player, Facebook® player, Flash® player) or playback device (e.g., Roku®, Chromecast®, Apple TV®) during video playback. The annotation metadata consists of an annotation unique identifier, the annotation text, and display directives, including the text's font, font size, and font color along with the coordinates of the annotation placement within the video. In block 403, the user attaches frame-based metadata to frames f_601-*f*_1200 to describes their contents. The metadata includes a unique identifier, a timestamp indicating when the metadata was attached, a short description of the frames (i.e., "Flyover Shot of the Texas Capitol Building"), and longer description of the frames.

An embodiment tracks continuous temporal metadata within a stage describing a range of continuous timestamps in the source or updated video. The continuous, temporal metadata may include a unique identifier, a timestamp designating the beginning of the timestamp range, a timestamp designating the end of the timestamp range, and a title and description of changes made. Continuous, temporal metadata differs from FBT metadata in that a range of timestamps within the video are provided instead of the frame numbers. For instance, a user may summarize a clip from 10 to 24.1 seconds into a video. Continuous temporal metadata may also include audio metadata (e.g., speech, music, and other sound clips). Example audio metadata can include voiceover commentary of video clip and alternative audio clips to use within the video. Audio metadata may include either single or multiple audio channels. Given that audio signals are continuous and video frames are discrete, the audio clip with a specific frame is aligned using timestamps to achieve audio/video synchronization before tracking frame changes.

In a standard post-production workflow, a series of edits is expected to occur, beginning with a source video, iterating through multiple intermediate videos, and ending with a final video. Each edit consists of a set of changes to the previous video, including adding frames, removing frames, updating frames, and adding or modifying the corresponding audio. An embodiment tracks a series of edits made to a source video and allows a user to track each edit in a stage. The workflow begins with a source video. A user may attach frame-based temporal metadata, continuous temporal metadata, or custom metadata to the source video. When a user completes a set of changes to the source video and its metadata, the user can stage the set of changes, the stage metadata (e.g., unique identifier, user information, description of changes made, timestamp), and the temporal metadata, continuous temporal metadata, and custom metadata.

The first stage stores each frame added to the source video, its corresponding audio track, the timestamp of the frame added, and the sequence order of the frame added. The timestamps and sequence order of the frames from the source video occurring after the added frames are updated within the stage. A frame that is deleted from the source video when constructing the updated video is preserved within the stage. The deleted frame, however, is not available within the updated video for playback. The timestamps and sequence order of the frames from the source video occurring after the frames removed are updated within the stage. A frame that is updated from the source video when constructing the updated video is preserved within the stage. The updated frame is also stored within the stage along with its audio track, the timestamp of the frame, and the sequence order of the frame. Timestamps and sequence order for frames occurring before and after the updated frame need not be updated.

The first stage can be uploaded to a server. The contents of the first stage include the source video, the set of changes to the source video, the stage metadata, and the various metadata added by a first user. The first stage can then be downloaded by a second user. When the second user downloads the first stage, the source video, the set of changes to the source video, the stage metadata, and the various metadata added by the first user are made available to the second user. After downloading the first stage, the edited video can be viewed via video playback by the second user. During video playback, custom metadata (e.g., annotations) added by the first user are made available to the video player (e.g., YouTube® player, Facebook® player, Flash® player) or playback device (e.g., Roku®, Chromecast®, Apple TV®). For instance, an annotation and its playback directives (e.g., x-y coordinates, font size, font color, playback duration) are made available to the video player or playback device. The video player or playback device controls how to render the annotation based on the metadata provided.

A typical post-production workflow will result in multiple stages. A new stage is constructed by applying and staging a set of changes to the video in the previous stage along with the new stage's metadata and any frame-based temporal, continuous temporal, and custom metadata attached to the updated video by a user. In an embodiment the previous stages are downloaded or transferred from a server to the user's computing device (e.g., personal computer, laptop, development server, production server). If the previous stages are already on the user's computing device, the previous stages need not be downloaded or transferred. A user proceeds with the most recent stage. The user can then apply a set of changes to the video from the previous stage, including adding, removing, and updating the video's frames and audio tracks. The user may attach frame-based temporal metadata, continuous temporal metadata, or custom metadata to the updated video. When the user completes a set of changes to the updated video and its metadata, the user can stage the set of changes, the stage metadata (e.g., unique identifier, user information, description of changes made, timestamp), and the temporal metadata, continuous temporal metadata, and custom metadata. The latest stage for the updated video can be uploaded to a server.

An embodiment allows a user to revert to the source video within a stage. For instance, when the second user downloads the first stage, the updated video is made available to the second user. After observing a description of the changes made to the source video, the second user may wish to observe the source video. Because the entirety of the source video is available within the first stage, the user can revert to the source video. The second user can then view the source video.

An embodiment enables a user to revert to any stage within the workflow's stages and to reconstruct the updated video within the stage along with the updated video's frame-based temporal metadata, continuous temporal metadata, and custom metadata stored within the stage. By tracking the frame changes at each stage in addition to the source video, the entirety of the intermediate video files are not stored. Given that the stage selected stores only the changes applied to the previous stage's video, the video for the stage selected must be reconstructed. To reconstruct the updated video for the stage selected, an embodiment computes a mathematical intersection of the sets of frames beginning with the source video through the stage selected video. The video for the stage selected is reconstructed by compiling the frames for the intersection of frames. The frame-based temporal metadata, continuous temporal metadata, and custom metadata stored within the stage are restored from within the stage and then reapplied to the video.

Figure 5:
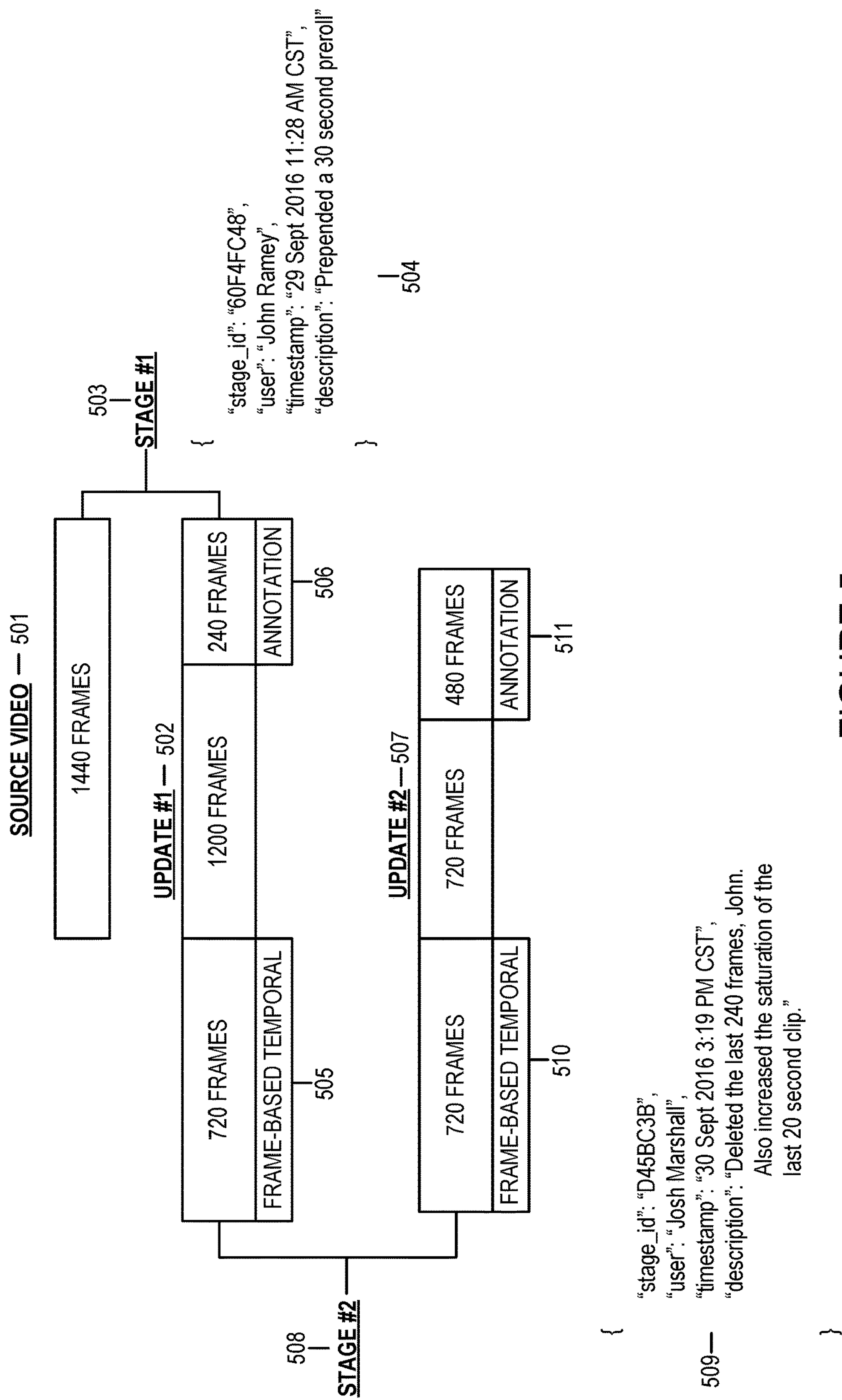
FIG. 5 includes a diagram for tracking a sequence of video edits across multiple stages in an embodiment of the invention.

In FIG. 5, blocks 501-511 illustrate an example sequence of two edits to a source video resulting in two stages. In block 501, 1,440 frames for a one-minute source video with a frame rate of 24 frames per second are given. In block 502, the user John Ramey prepends 720 frames (i.e., 30 seconds) to the source video, producing the first updated video. In block 503, the user John Ramey stages the changes made to the source video and adds the metadata given in block 504 to the stage describing the changes made to the source video. Other users can view, modify, or remove the stage metadata provided in block 504. In block 505, John adds frame-based metadata to the prepended clip of 720 frames (i.e., 30 seconds at 24 frames per second), indicating that its contents include an "Introduction Clip with Flyover Shot of Texas Capitol Building" along with other metadata (e.g., unique identifier, timestamp, more detailed description). The frame-based temporal metadata in block 505 are added to the stage listed in block 503. In block 506, John adds custom metadata to the last 240 frames (i.e., 10 seconds at 24 frames per second) with an annotation in the upper-left corner of the video with text stating, "Josh, should I keep or delete these frames?"

Continuing with the example in FIG. 5, in block 507, the second user Josh Marshall receives the source video, the changes made to the source video in block 502, and the metadata staged in block 503. Josh reverts back to the source video and observes the source video without the prepended 720 frames added in block 502. Josh again reverts back to the changes made in block 502. Josh then views the updated video of block 502. During video playback, Josh observes the annotation text of block 506 and proceeds to remove the final 240 frames from the video Update #1 and subsequently increases the saturation of the last 480 frames, resulting in video Update #2 in block 507. In block 508, Josh stages the changes made in video Update #1 and adds the metadata, including a stage unique identifier, description of the changes made, and timestamp, given in block 509. Other users can view, modify, or remove the stage metadata provided in block 509. In block 510, the frame-based temporal metadata attached to the first 720 frames by user John Ramey in block 505 persists and is visible to the user Josh Marshall. In block 511, the user Josh Marshall adds custom metadata to the last 480 frames (i.e., 20 seconds at 24 frames per second) with an annotation in the upper-left corner of the video with text stating, "John, I deleted the frames you asked about. I also increased the saturation of the last 20-second clip." Josh then uploads Stage #2 to the server for other users, including John Ramey, to observe the latest changes.

Figure 9:
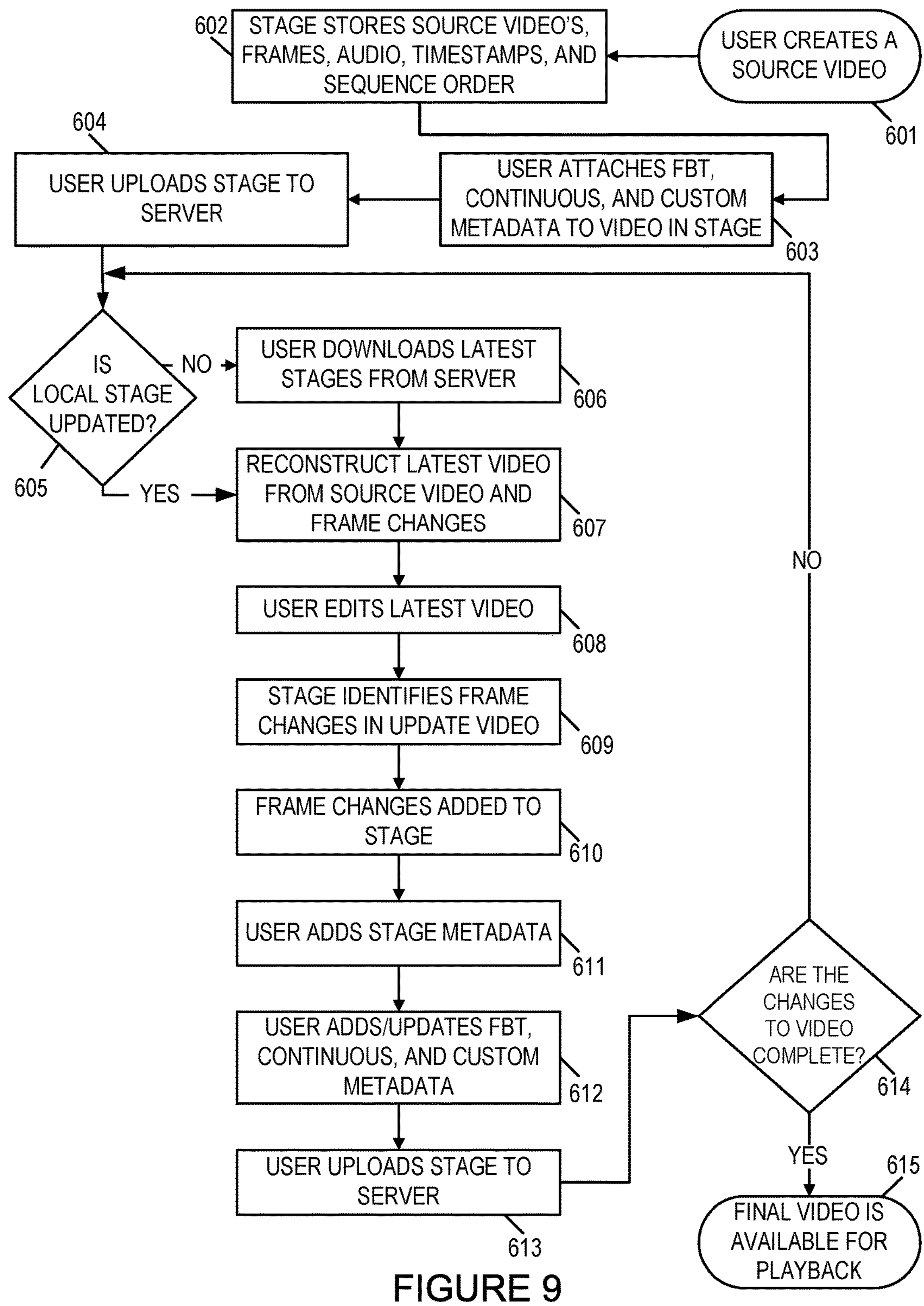
FIG. 9 depicts a process in an embodiment of the invention.

In FIG. 9, blocks 601-615 illustrate a flowchart for a post-production workflow with staging. In block 601, a first user creates a source video. In block 602, the first stage stores the source video's frames, their corresponding audio tracks, the timestamp of the frames, and the sequence order of the frames. In block 603, the first user may attach frame-based temporal metadata, continuous temporal metadata, and custom metadata to the source video within the stage. The source video and metadata are then staged. In block 604, the first user uploads the first stage to a server. In block 605, a check is performed to determine whether a second user has the latest stages on his local computing device (e.g., personal computer, laptop, development server). In an embodiment, if the latest stages are not on his local computing device, the second user downloads the latest stages from the server in block 606.

In block 607, the latest video is reconstructed from the source video, the various frame changes, and their corresponding audio tracks from the stages on the second user's local computing device. In block 608, the second user edits the video, constructing an updated video. In block 609, the stage identifies the changes made in the latest video by constructing frame signatures and comparing them to the frame signatures of the previous video. The frames added, removed, and updated are determined by aligning the two sequences of signatures. In block 610, the frame changes are added to the current stage. The stage stores frames added and updated along with their audio tracks and timestamps. The frames added and updated are inserted into the sequence order. The frames removed are withdrawn from the sequence order. The sequence order of the frames from the previous video remaining in the updated video are recomputed.

In block 611, the second user adds stage metadata describing the context and changes made within the stage, including a stage unique identifier, a timestamp, user information (e.g., user unique identifier, user's name) and a description of the changes made. In block 612, the second user adds frame-based temporal, continuous temporal, and custom metadata to the updated video. Existing frame-based temporal, continuous temporal, and custom metadata are updated to reflect the changes made in the video. For instance, if frame-based temporal metadata refer to frames removed, the frame-based temporal metadata are removed from the current stage. In block 613, the current stage is uploaded to the server with the staged changes, including changes made to the previous video, the frame sequence order, the stage metadata, and the frame-based temporal, continuous temporal, and custom metadata. Block 614 indicates that blocks 605-613 are repeated until the changes to the video are completed, and a final video is available for playback in block 615. If more changes to the most recent video are necessary in block 614, a user repeats the workflow given in block 605-613. The user may be the first user, the second user, or a third user.

Figure 6:
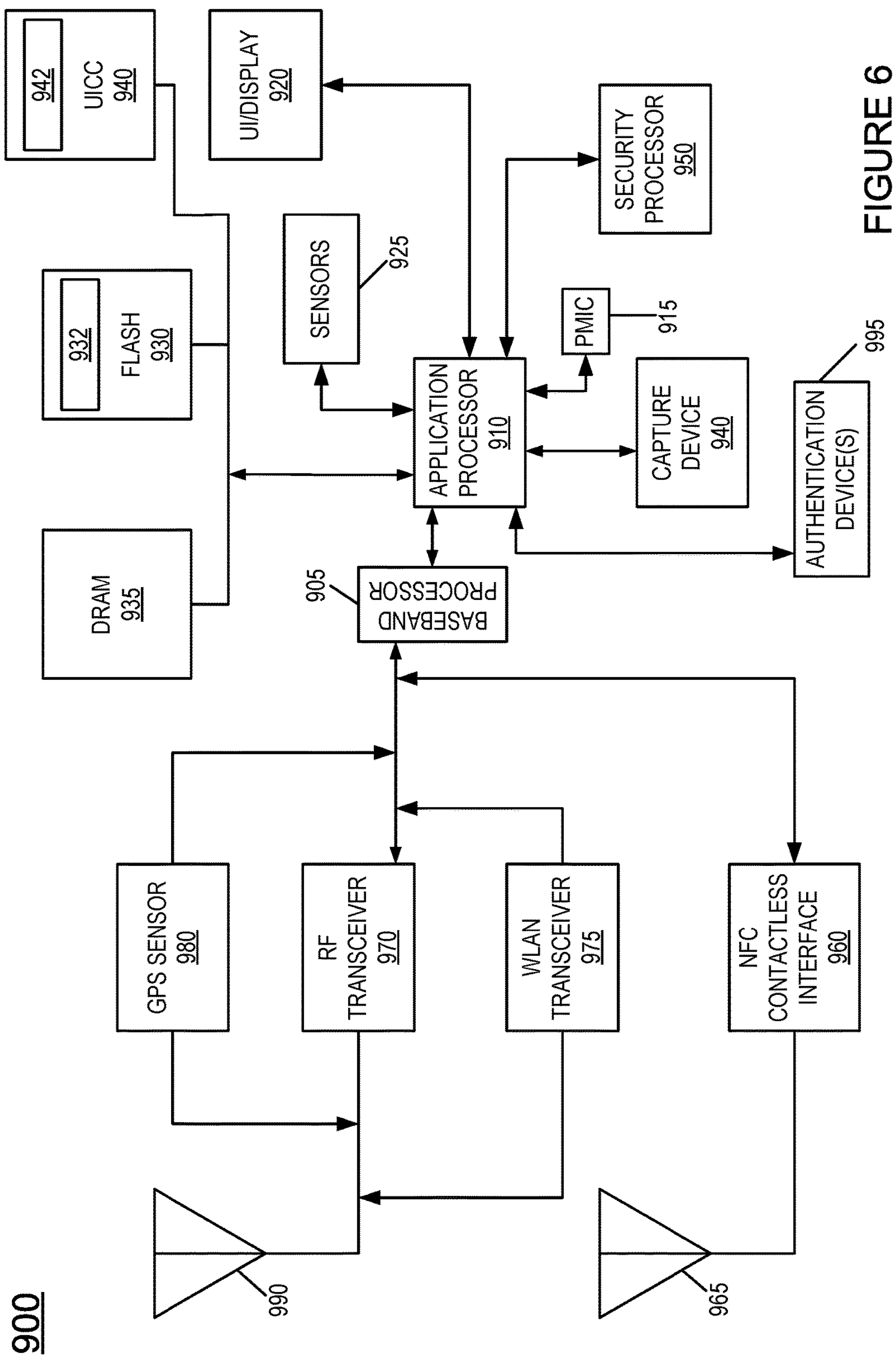
FIGS. 6, 7, 8 include systems upon which embodiments are used.

Referring now to FIG. 6, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920 (e.g., touch screen display). In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

A universal integrated circuit card (UICC) 940 comprises a subscriber identity module, which in some embodiments includes a secure storage 942 to store secure user information. System 900 may further include a security processor 950 (e.g., Trusted Platform Module (TPM)) that may couple to application processor 910. A plurality of sensors 925, including one or more multi-axis accelerometers may couple to application processor 910 to enable input of a variety of sensed information such as motion and other environmental information. In addition, one or more authentication devices 995 may be used to receive, for example, user biometric input for use in authentication operations.

As further illustrated, a near field communication (NFC) contactless interface 960 is provided that communicates in a NFC near field via an NFC antenna 965. While separate antennae are shown, understand that in some implementations one antenna or a different set of antennae may be provided to enable various wireless functionalities.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitries may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals (e.g., AM/FM) and other signals may also be provided. In addition, via WLAN transceiver 975, local wireless communications, such as according to a Bluetooth™ or IEEE 802.11 standard can also be realized.

Figure 7:
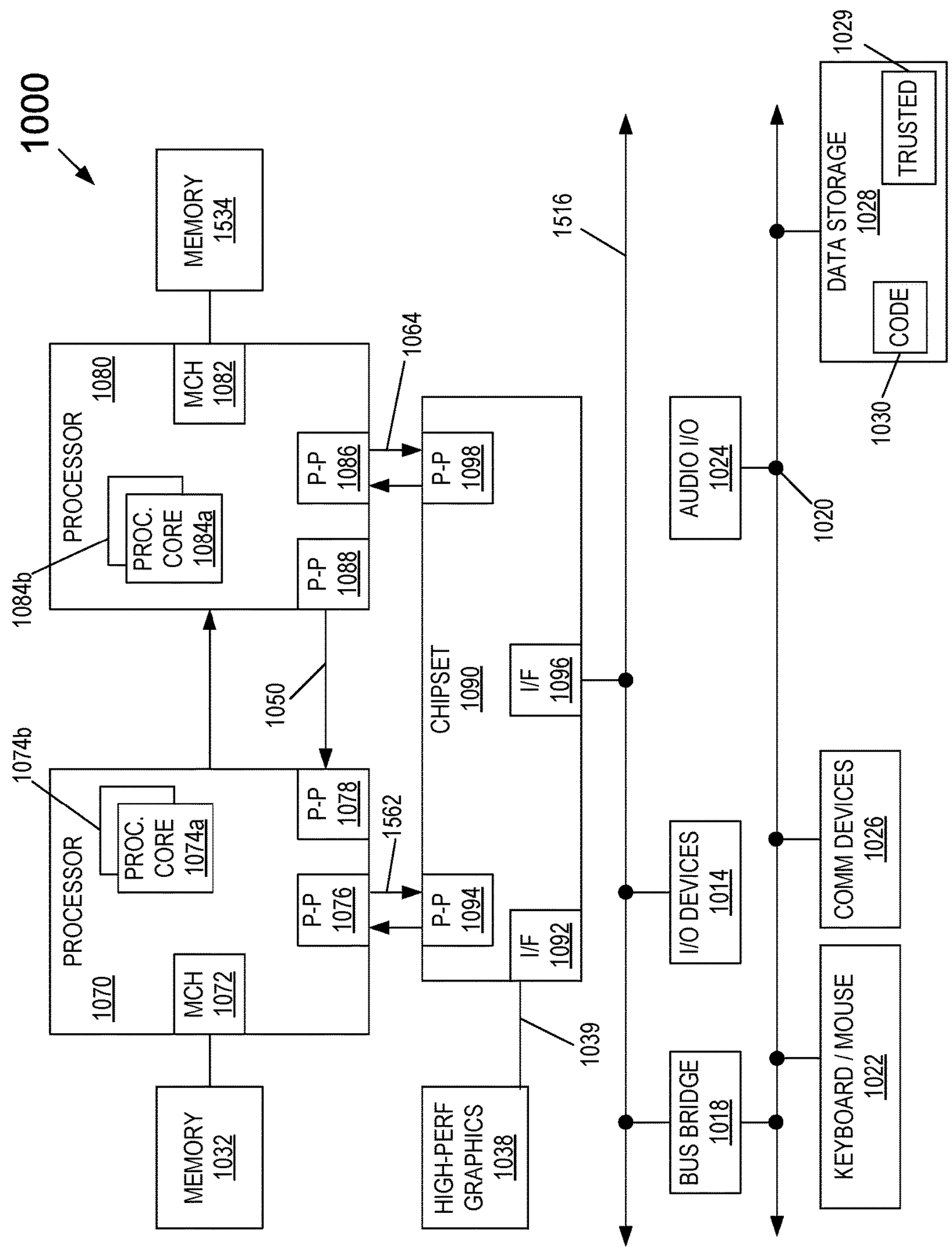

Referring now to FIG. 7, shown is a block diagram of a system in accordance with another embodiment of the present invention. Multiprocessor system 1000 is a point-to-point interconnect system such as a server system, and includes a first processor 1070 and a second processor 1080 coupled via a point-to-point interconnect 1050. Each of processors 1070 and 1080 may be multicore processors such as SoCs, including first and second processor cores (i.e., processor cores 1074*a* and 1074*b* and processor cores 1084*a* and 1084*b*), although potentially many more cores may be present in the processors. In addition, processors 1070 and 1080 each may include a secure engine 1075 and 1085 to perform security operations such as attestations, IoT network onboarding or so forth.

First processor 1070 further includes a memory controller hub (MCH) 1072 and point-to-point (P-P) interfaces 1076 and 1078. Similarly, second processor 1080 includes a MCH 1082 and P-P interfaces 1086 and 1088. MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. Chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. Various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 8:
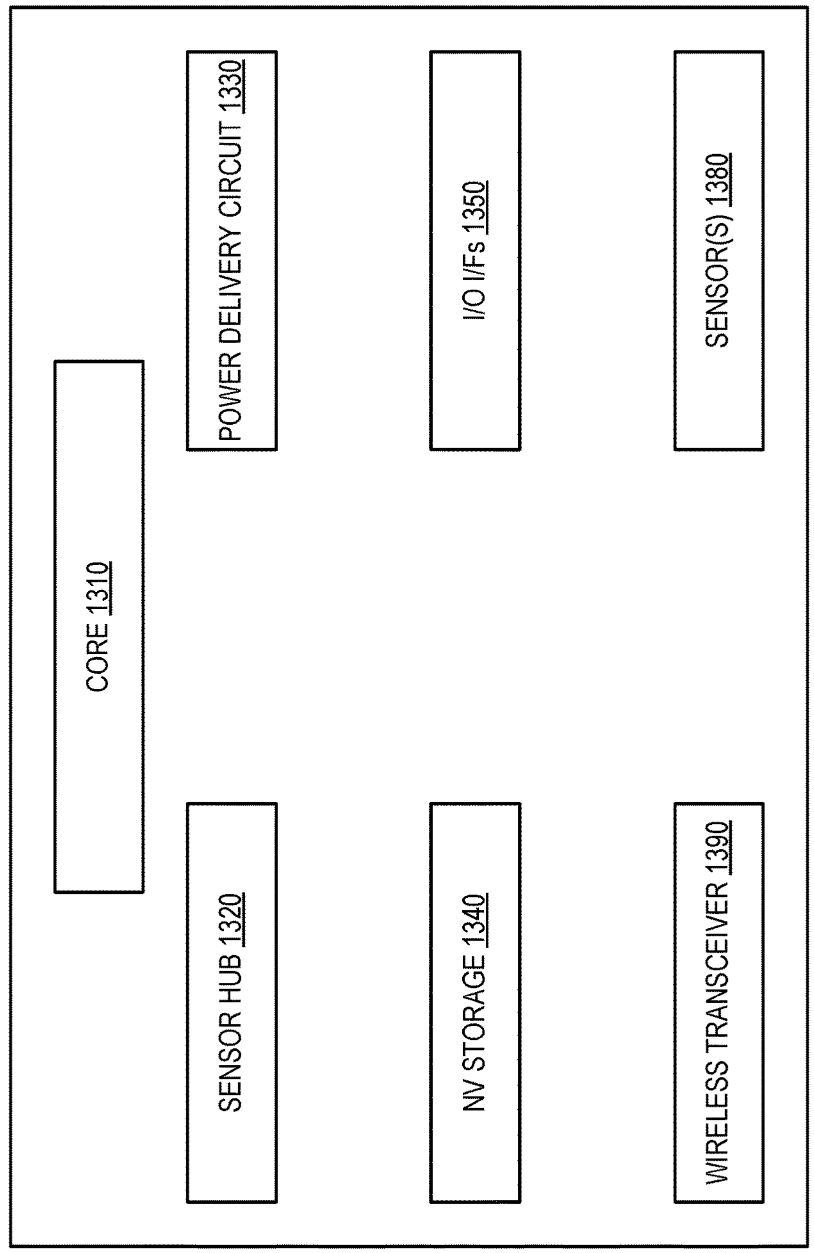

Embodiments may be used in environments where IoT devices may include wearable devices or other small form factor Internet of Things (IoT) devices. Referring now to FIG. 8, shown is a block diagram of a wearable module 1300 in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I2C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms. Wearable and/or IoT devices have, in comparison with a typical general purpose CPU or a GPU, a small form factor, low power requirements, limited instruction sets, relatively slow computation throughput, or any of the above.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Example 1 includes a method for determining frame differences between two videos, comprising: digitally encoding the sequence of frames from said video; compiling an encoding signature from said sequence of frames; and determining the value of similarity between two encoding signatures.

Example 2 includes the method of example 1, wherein said step of encoding a sequence of frames comprises determining a lossless encoding to produce one or more encoding signatures.

Example 3 includes the method of example 1, wherein said step of encoding a sequence of frames comprises determining a lossy encoding to produce one or more encoding signatures.

Example 4 includes the method of example 3, wherein said step of determining a lossy encoding comprises determining an information loss parameter in said lossy encoding.

Example 5 includes the method of example 1, wherein said step of compiling an encoding signature comprises compiling encoding signatures for two videos.

Example 6 includes the method of example 5, wherein said step of compiling encoding signatures for two videos comprises compiling encoding signatures for two videos.

Example 7 includes the method of example 1, wherein said step of determining the value of similarity comprises comparing the statistical information for encoding signatures using a statistical measurement.

Example 8 includes the method of example 1, wherein said step of determining the value of similarity comprises computing the longest subsequence common to both encoding signatures.

Example 9 includes the method of example 8, wherein said step of determining the value of similarity comprises determining the frames added, deleted, or changed.

Example 10 includes the method of example 1, wherein said step of determining the value of similarity comprises comparing the statistical information for encoding signatures using a statistical measurement.

Example 11 includes the method of example 1, wherein said step of determining the value of similarity comprises computing the number of frames two sequences of frames have in common.

Example 12includes the method of example 11, wherein said step of determining the value of similarity comprises determining whether the two sequences of frames are the same.

Example 13 includes the method of example 12, wherein said determining whether the two sequences of frames are the same comprises determining a threshold below which the statistical similarity between said sequences of frames are equal.

Example 14 includes the method of example 11, wherein said step of determining the value of similarity comprises determining whether two videos are the same.

Example 15 includes the method of example 14, wherein said step of determining the value of similarity comprises determining whether two videos are the same.

Example 16 includes the method of example 15, wherein said determining whether two videos are the same comprises determining a threshold below which the statistical similarity between said videos are equal.

Example 17 includes a method for detecting and monitoring changes to a video, comprising: identifying sequences of frames that differ between the video and another video, and monitoring for changes in the video and the other video.

Example 18 includes the method of example 17 further comprising the step of: attaching a unique identifier, user information, timestamp, description of video changes, and other metadata to a staging environment between two videos.

Example 19 includes the method of example 17 further comprising the step of: attaching frame-based temporal metadata (e.g., annotation title, annotation player placement) to describe a sequence of frames in a video before or after changes.

Example 20 includes the method of example 19, wherein said attaching frame-based temporal metadata comprises providing said frame-based temporal metadata to a video player, over-the-top player, or other video playback device.

Example 21 includes the method of example 17 further comprising the step of: attaching continuous temporal metadata (e.g., audio) to describe a range of timestamps of a video before or after changes.

Example 22 includes the method of example 21, wherein said attaching continuous temporal metadata comprises providing said continuous temporal metadata to a video player, over-the-top player, or other video playback device.

Example 23 includes the method of example 21, wherein said attaching continuous temporal metadata comprises discretizing and aligning said continuous temporal metadata with their corresponding sequence of frames.

Example 24 includes the method of example 23, wherein said discretizing and aligning continuous temporal metadata comprises discretizing and aligning audio to the sequence of frames for audio-to-video synchronization.

Example 25 includes the method of example 17, wherein said monitoring for changes between the original video and the second video comprises monitoring for changes between the second video and a third video Example 26 includes the method of example 17 further comprising the step of: storing various versions of the original video on a server.

Example 27 includes the method of example 17 further comprising the step of: archiving, on a separate server, the changes in the original video, as detected during such monitoring.

Example 28 includes the method of example 17 further comprising the step of: archiving, on a separate server, the changes in the original video, as detected during such monitoring.

Example 29 includes the method of example 18, wherein said attaching the various metadata to a staging environment comprises storing the various metadata on a server.

Example 30 includes the method of example 18 further comprising the step of: presenting to a user, an option to view the unique identifier, user information, timestamp, description of video changes, and other metadata within the staging environment.

Example 31 includes the method of example 17 further comprising the step of: providing a user the option to view the original video and a monitored video via a video player.

Example 32 includes the method of example 31, wherein said providing the user the option to view the original video and a monitored video comprises displaying a single instance of a graphical user interface (GUI) wherein the video player is loaded for video playback.

Example 33 includes the method of example 41, wherein said displaying the continuous temporal metadata describing a range of timestamps before or after changes to the original video comprises discretizing and aligning said continuous temporal metadata with their corresponding sequence.

Example 34 includes the method of example 31, wherein said providing the user the option to view the original video and a monitored video comprises displaying a summary of added, deleted, updated, and unchanged sequences of frames.

Example 35 includes the method of example 34, wherein said displaying a summary of added, deleted, updated, and unchanged sequences of frames comprises displaying a graphical summary of added, deleted, updated, and unchanged sequences of frames.

Example 36 includes the method of example 41, wherein said displaying the continuous temporal metadata describing a range of timestamps before or after changes to the original video comprises providing said continuous temporal metadata to a video player, over-the-top player, or other video playback device.

Example 37 includes the method of example 31, wherein said providing the user the option to view the original video and a monitored video comprises displaying an option to view a history of the different changes to the original video.

Example 38 includes the method of example 31, wherein said providing the user the option to view the original video and a monitored video comprises displaying the unique identifier, user information, timestamp, description of video changes, and other metadata from the staging environment.

Example 39 includes the method of example 31, wherein said providing the user the option to view the original video and a monitored video comprises displaying the frame-based temporal metadata describing a sequence of frames before or after changes to the original video.

Example 40 includes the method of example 39, wherein said displaying the frame-based temporal metadata describing a sequence of frames before or after changes to the original video comprises providing said frame-based temporal metadata to a video player, over-the-top player, or other video playback device.

Example 41 includes the method of example 31, wherein said providing the user the option to view the original video and a monitored video comprises displaying the continuous temporal metadata describing a range of timestamps before or after changes to the original video.

Example 1a includes a method executed by at least one processor, coupled to at least one memory, comprising: obtaining a first video file including a first series of video frames; encoding the first series of video frames to determine first encoded video frames having at least one first signature; editing the first series of video frames to determine a second series of video frames that is not identical to the first series of video frames; encoding the second series of video frames to determine second encoded video frames having at least one second signature; comparing the at least one first signature to the at least one second signature to determine the second series of video frames has a first difference with the first series of video frames, the first difference including at least one of: (a)(i) a video frame included in the second series of video frames but not the first series of video frames, (a)(ii) a video frame included in the first series of video frames but not the second series of video frames, and (a)(iii) a video frame included in the first series and an altered version of the video frame in the second series of video frames; in response to comparing the at least one first signature to the at least one second signature to determine the second series of video frames has a first difference from the first series of video frames, determining a first series subset of video frames is common to both the first and second series of video frames; and playing the second series of video frames and, afterwards, playing the first series of video frames; wherein playing the first and second series of video frames both include playing the first series subset of video frames while the first series subset of video frames is stored in a single memory region of the at least one memory.

Example 2a includes the method of example 1a, wherein the comparing the at least one first signature to the at least one second signature to determine the second series of video frames has a first difference with the first series of video frames comprises aligning the at least one first signature to the at least one second signature.

Example 3a includes the method of example 2a, wherein the aligning the at least one first signature to the at least one second signature comprises determining a maximum sequence length of contiguous signatures common to both the at least one first and second signatures.

Example 4a includes the method of example 3a, wherein the comparing the at least one first signature to the at least one second signature to determine the second series of video frames has a first difference with the first series of video frames comprises determining a signature included in the at least one first signature satisfies a similarity threshold with regard to a signature included in the at least one second signature.

For example, satisfying a threshold may mean a difference is less than threshold distance or greater than needed similarity threshold.

Example 5a includes the method of example 1a, wherein playing the second series of video frames and, afterwards, playing the first series of video frames comprises playing a video frame having a first sequence position in the first series of video frames and a second sequence position, unequal to the first sequence position, in the second series of video frames.

For instance, a frame may be first in a sequence of frames (stage 1) but then that same frame may be second in the sequence (stage 2) if an additional frame is inserted before it.

Example 6a includes the method of example 1a, wherein: the playing the first series of video frames comprises playing first, second, and third video frames with the second video frame being played immediately after the first video frame is played and the third video frame being played immediately after the second video frame is played; the playing the second series of video frames comprises playing the first and the third video frames and an altered version of the second video frame with the altered version of the second video frame being played immediately after the first video frame is played and the third video frame being played immediately after the altered version of the second video frame is played; the first and third video frames are not relocated within the at least one memory between a time when the second series of video frames is played and a time when the first series of video frames is played; the second video frame and the altered version of the second video frame are simultaneously present at different locations in the at least one memory.

Example 7a includes the method of example 6a comprising: associating metadata with the second video frame; displaying text, which is based on the metadata, while playing the second video frame; associating additional metadata with the altered version of the second video frame; and displaying additional text, which is based on the additional metadata and unequal to the text, while playing the altered version of the second video frame.

Example 8a includes the method of example 1a comprising: associating first metadata with the first series of video frames; and displaying text, which is based on the first metadata, while playing multiple video frames included in the first series of video frames.

Example 9a includes the method of example 8a comprising displaying the text while playing multiple video frames included in the second series of video frames.

Example 10a includes the method of example 8a, wherein associating the first metadata with the first series of video frames comprises associating the first metadata with first, second, and third video frames included in the first series of video frames and displaying the text while playing each of the first, second, and third video frames.

Example 11a includes the method of example 1a comprising associating first metadata with each of first, second, and third video frames included in the first series of video frames.

Example 12a includes the method of example 1a comprising: associating first metadata with a first time stamp, a second time stamp, and a third time stamp; and displaying text, which is based on the first metadata, while playing video frames corresponding to the first, second, and third time stamps.

Example 13a includes the method of example 1a comprising: associating first metadata with the first series of video frames; and playing audio, which is based on the first metadata, while playing multiple video frames included in the first series of video frames.

Example 14a includes the method of example 1a comprising: associating first metadata with the first difference; and displaying text, which is based on the first metadata, while playing multiple video frames included in the second series of video frames.

For instance, the metadata may concern stage metadata addressed above.

Example 15a includes the method of example 1a comprising: associating first, second, and third video frame sequence orders with first, second, and third video frames included in the first series of video frames; adjusting the first sequence order in response to determining the second series of video frames has a first difference with the first series of video frames.

Example 16a includes the method of example 1a, wherein the first difference includes a video frame included in the first series of video frames but not the second series of video frames.

Example 17a includes the method of example 1a comprising determining first and second stages, wherein: the first difference includes a video frame included in the second series of video frames but not the first series of video frames; the first stage includes the first series of video frames, the video frame included in the second series of video frames but not the first series of video frames, audio corresponding to the video frame included in the second series of video frames but not the first series of video frames, a timestamp associated with the video frame included in the second series of video frames but not the first series of video frames, and a sequence order of the video frame included in the second series of video frames but not the first series of video frames; the second stage does not include the first series of video frames.

Example 18a includes the method of example 1a comprising determining a stage, wherein: the first difference includes a video frame included in the second series of video frames but not the first series of video frames; the stage includes the video frame included in the second series of video frames but not the first series of video frames, audio corresponding to the video frame included in the second series of video frames but not the first series of video frames, a timestamp associated with the video frame included in the second series of video frames but not the first series of video frames, and a sequence order of the video frame included in the second series of video frames but not the first series of video frames; the stage does not include the first series of video frames; and an additional stage includes the first series of video frames.

Example 19a includes at least one machine readable medium comprising a plurality of instructions that in response to being executed on a computing device, cause the computing device to carry out a method according to any one of examples 1a to 18a.

Example 20a includes an apparatus comprising means for performing any one of examples 1a to 18a.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory machine-readable medium having stored thereon data which, when executed by at least one machine, causes the at least one machine to perform operations comprising: obtaining a first video file including a first series of video frames; encoding the first series of video frames to determine first encoded video frames having at least one first signature; editing the first series of video frames to determine a second series of video frames that is not identical to the first series of video frames; encoding the second series of video frames to determine second encoded video frames having at least one second signature; comparing the at least one first signature to the at least one second signature to determine the second series of video frames has a first difference with the first series of video frames, the first difference including at least one of: (a)(i) a video frame included in the second series of video frames but not the first series of video frames, (a)(ii) a video frame included in the first series of video frames but not the second series of video frames, or (a)(iii) a video frame included in the first series and an altered version of the video frame included in the second series of video frames; in response to comparing the at least one first signature to the at least one second signature to determine the second series of video frames has a first difference from the first series of video frames, determining a first series subset of video frames is common to both the first and second series of video frames; and playing the second series of video frames and, afterwards, playing the first series of video frames; wherein playing the first and second series of video frames both include playing the first series subset of video frames while the first series subset of video frames is stored in a single memory region of the at least one memory.

2. The at least one medium of claim 1, wherein the comparing the at least one first signature to the at least one second signature to determine the second series of video frames has a first difference with the first series of video frames comprises aligning the at least one first signature with the at least one second signature.

3. The at least one medium of claim 2, wherein the aligning the at least one first signature with the at least one second signature comprises determining a maximum sequence length of contiguous signatures common to both the at least one first and second signatures.

4. The at least one medium of claim 3, wherein the comparing the at least one first signature to the at least one second signature to determine the second series of video frames has a first difference with the first series of video frames comprises determining a signature included in the at least one first signature satisfies a similarity threshold with regard to a signature included in the at least one second signature.

5. The at least one medium of claim 1, wherein playing the second series of video frames and, afterwards, playing the first series of video frames comprises playing a video frame having a first sequence position in the first series of video frames and a second sequence position, unequal to the first sequence position, in the second series of video frames.

6. The at least one medium of claim 1, wherein: the playing the first series of video frames comprises playing first, second, and third video frames with the second video frame being played immediately after the first video frame is played and the third video frame being played immediately after the second video frame is played; the playing the second series of video frames comprises playing the first and the third video frames and an altered version of the second video frame with the altered version of the second video frame being played immediately after the first video frame is played and the third video frame being played immediately after the altered version of the second video frame is played; the first and third video frames are not relocated within the at least one memory between a time when the second series of video frames is played and a time when the first series of video frames is played; the second video frame and the altered version of the second video frame are simultaneously present at different locations in the at least one memory.

7. The at least one medium of claim 6, the operations comprising: associating metadata with the second video frame; displaying text, which is based on the metadata, while playing the second video frame; associating additional metadata with the altered version of the second video frame; and displaying additional text, which is based on the additional metadata and unequal to the text, while playing the altered version of the second video frame.

8. The at least one medium of claim 1, the operations comprising: associating first metadata with the first series of video frames; and displaying text, which is based on the first metadata, while playing multiple video frames included in the first series of video frames.

9. The at least one medium of claim 8, the operations comprising displaying the text while playing multiple video frames included in the second series of video frames.

10. The at least one medium of claim 8, wherein associating the first metadata with the first series of video frames comprises associating the first metadata with first, second, and third video frames included in the first series of video frames and displaying the text while playing each of the first, second, and third video frames.

11. The at least one medium of claim 1, the operations comprising associating first metadata with each of first, second, and third video frames included in the first series of video frames.

12. The at least one medium of claim 1, the operations comprising: associating first metadata with a first time stamp, a second time stamp, and a third time stamp; and displaying text, which is based on the first metadata, while playing video frames corresponding to the first, second, and third time stamps.

13. The at least one medium of claim 1, the operations comprising: associating first metadata with the first series of video frames; and playing audio, which is based on the first metadata, while playing multiple video frames included in the first series of video frames.

14. The at least one medium of claim 1, the operations comprising: associating first metadata with the first difference; and displaying text, which is based on the first metadata, while playing multiple video frames included in the second series of video frames.

15. The at least one medium of claim 1, the operations comprising: associating first, second, and third video frame sequence orders with first, second, and third video frames included in the first series of video frames; adjusting the first sequence order in response to determining the second series of video frames has a first difference with the first series of video frames.

16. The at least one medium of claim 1, wherein the first difference includes a video frame included in the first series of video frames but not the second series of video frames.

17. The at least one medium of claim 1, the operations comprising determining first and second stages, wherein: the first difference includes a video frame included in the second series of video frames but not the first series of video frames; the first stage includes the first series of video frames, the video frame included in the second series of video frames but not the first series of video frames, audio corresponding to the video frame included in the second series of video frames but not the first series of video frames, a timestamp associated with the video frame included in the second series of video frames but not the first series of video frames, and a sequence order of the video frame included in the second series of video frames but not the first series of video frames; the second stage does not include the first series of video frames.

18. The at least one medium of claim 1 comprising determining a stage, wherein: the first difference includes a video frame included in the second series of video frames but not the first series of video frames; the stage includes the video frame included in the second series of video frames but not the first series of video frames, audio corresponding to the video frame included in the second series of video frames but not the first series of video frames, a timestamp associated with the video frame included in the second series of video frames but not the first series of video frames, and a sequence order of the video frame included in the second series of video frames but not the first series of video frames; the stage does not include the first series of video frames; and an additional stage includes the first series of video frames.

19. An apparatus comprising: at least one memory; at least one processor, coupled to the memory, to perform operations comprising: obtaining a first video file including a first series of video frames; encoding the first series of video frames to determine first encoded video frames having at least one first signature; editing the first series of video frames to determine a second series of video frames that is not identical to the first series of video frames; encoding the second series of video frames to determine second encoded video frames having at least one second signature; comparing the at least one first signature to the at least one second signature to determine the second series of video frames has a first difference with the first series of video frames, the first difference including at least one of: (a)(i) a video frame included in the second series of video frames but not the first series of video frames, (a)(ii) a video frame included in the first series of video frames but not the second series of video frames, or (a)(iii) a video frame included in the first series and an altered version of the video frame included in the second series of video frames; in response to comparing the at least one first signature to the at least one second signature to determine the second series of video frames has a first difference from the first series of video frames, determining a first series subset of video frames is common to both the first and second series of video frames; and playing the second series of video frames and, afterwards, playing the first series of video frames; wherein playing the first and second series of video frames both include playing the first series subset of video frames while the first series subset of video frames is stored in a single memory region of the at least one memory.

* * * * *